US009783980B2

(12) United States Patent
Snyder et al.

(10) Patent No.: US 9,783,980 B2
(45) Date of Patent: Oct. 10, 2017

(54) BUILDING MEMBRANE WITH DRAINAGE MATRIX AND HORIZONTAL ADHESIVE PORTIONS (71) Applicant: VAPROSHIELD, LLC, Gig Harbor, WA (US)

(72) Inventors: Leland D. Snyder, Gig Harbor, WA (US); Kevin Nolan, Seattle, WA (US)

(73) Assignee: VAPROSHIELD, LLC, Gig Harbor, WA (US)

( * ) Notice: Subject to any disclaimer, the term of this patent is extended or adjusted under 35 U.S.C. 154(b) by 120 days.

(21) Appl. No.: 14/662,040

(22) Filed: Mar. 18, 2015

(65) Prior Publication Data
US 2016/0002914 A1 Jan. 7, 2016

Related U.S. Application Data (60) Provisional application No. 61/998,542, filed on Jul. 1, 2014.

(51) Int. Cl.
E04C 1/00 (2006.01)
E04B 1/62 (2006.01)
E04D 11/02 (2006.01)
B32B 5/02 (2006.01)
B32B 7/12 (2006.01)
E04D 11/00 (2006.01)

(52) U.S. Cl.
CPC .............. *E04B 1/625* (2013.01); *E04D 11/02* (2013.01); *B32B 5/02* (2013.01); *B32B 7/12* (2013.01); *E04D 11/002* (2013.01); *Y10T 428/1471* (2015.01)

(58) Field of Classification Search
CPC .. E04B 1/625; B32B 5/02; B32B 7/12; E04D 11/02; E04D 11/002; Y10T 428/1471
USPC ... 52/309.1, 408, 413, 309.8, 309.13, 746.1, 52/409, 416
See application file for complete search history.

(56) References Cited

U.S. PATENT DOCUMENTS

| 4,098,044 | A |   | 7/1978 | Slavik |
| 4,252,590 | A |   | 2/1981 | Rasen et al. |
| 4,315,392 | A | * | 2/1982 | Sylvest ............ E04D 5/10 52/309.1 |
| 4,815,963 | A | * | 3/1989 | Berkhout ......... B01D 39/083 405/129.7 |

(Continued)

FOREIGN PATENT DOCUMENTS

EP  0874099  2/2001

OTHER PUBLICATIONS

E.I. du Pont De Nemours and Company, "DuPont TYVEK® Providing Protection in Construction".

(Continued)

*Primary Examiner* — Chi Q Nguyen
(74) *Attorney, Agent, or Firm* — John S. Hale; Gipple & Hale (57) ABSTRACT A building wrap membrane comprising a sheet of spun-bonded polypropylene fabric member with integral adhesive attachment strips mounted on the front and back of the sheet and a drainage matrix secured to the sheet front surface comprised of individual thermoplastic threads randomly laid down to form a net and secured together by heat bonding with the threads formed into spaced rows with a plurality of expansion joints formed across matrix rows.

17 Claims, 5 Drawing Sheets

(56) References Cited

U.S. PATENT DOCUMENTS

| | | | |
|---|---|---|---|
| 4,851,272 A * | 7/1989 | Knox, III | B32B 27/322 |
| | | | 428/216 |
| 5,099,627 A | 3/1992 | Coulton et al. | |
| 5,425,672 A | 6/1995 | Rotter | |
| 5,598,673 A * | 2/1997 | Atkins | E04B 1/7046 |
| | | | 52/302.1 |
| 5,617,687 A * | 4/1997 | Bussey, Jr. | E04B 1/762 |
| | | | 156/71 |
| 5,960,595 A | 10/1999 | McCorsley, III et al. | |
| 6,131,353 A | 10/2000 | Egan | |
| 6,594,965 B2 | 7/2003 | Coulton | |
| 6,804,922 B1 | 10/2004 | Egan | |
| 8,146,310 B2 * | 4/2012 | Keene | E04F 15/20 |
| | | | 442/36 |
| 8,245,472 B2 * | 8/2012 | Keene | E04F 13/04 |
| | | | 52/344 |
| 8,387,336 B2 * | 3/2013 | Coulton | B32B 7/14 |
| | | | 52/409 |
| 8,590,267 B2 * | 11/2013 | Jaffee | E04D 12/00 |
| | | | 428/114 |
| 9,453,337 B2 * | 9/2016 | Fritz | E04B 2/28 |
| 2002/0146953 A1 * | 10/2002 | Lubker, II | B32B 5/12 |
| | | | 442/187 |
| 2004/0180195 A1 | 9/2004 | Macuga | |
| 2005/0055983 A1 * | 3/2005 | Tomes | E04B 1/70 |
| | | | 52/782.1 |
| 2006/0096218 A1 | 5/2006 | Johnson | |
| 2006/0101758 A1 * | 5/2006 | Egan | E04F 13/0885 |
| | | | 52/408 |

OTHER PUBLICATIONS

Irish Agrement Board, "DuPont TYVEK® SUPRO Vapour Permeable Roofing Underlays for Pitched Roofs", Certificate No. 04/0157, Nov. 2004.

British Board of Agrement, TYVEK® SUPRO Roof Tile Underlayment for Use in Warm Non-Ventilated and Cold Ventilated Roofs, Certificate No. 08/4548, Apr. 8, 2008.

Cosella-Dorken Products, Inc. Technical Data Sheet for DELTA®-Fassade S and DELTA®-Fassade S Plus UV, Dec. 21, 2011.

Cosella-Dorken Products, Inc. Technical Data Sheet for DELTA®-Vent S.

* cited by examiner

BUILDING MEMBRANE WITH DRAINAGE MATRIX AND HORIZONTAL ADHESIVE PORTIONS

RELATED APPLICATIONS

This is a utility application claiming benefit and priority from U.S. Provisional Application No. 61/998,542, filed Jul. 1, 2014.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

None.

FIELD OF THE INVENTION

The present invention generally relates to preformed sheet membrane used in the construction of buildings to control the movement of air and water through the building envelope, and more particularly, to an above ground air barrier, vapor permeable building underlayment sheet or membrane provided with a drain matrix and integral pressure sensitive adhesive strips.

BACKGROUND OF THE INVENTION

Buildings are typically constructed with structural, underlayment sheets in a spaced arrangement to cover walls and roofs. The present inventive building wrap is used to wrap the exterior surface of the building during construction. The building wrap forms a barrier layer from exterior outside water or moisture while allowing water vapor transmission from the interior of the building. Typical wrap barrier materials include spunbonded high density polyethylene fibers, non-woven barrier material and microperforated polyethylene sheet material. Previous construction methods and materials may lead to entrapment of moisture that can result in formation of mold and mildew, wood rot and a host of other problems.

DESCRIPTION OF PRIOR ART

The prior art shows the use of sheet material having plastic threads arranged to form a drain matrix. The prior art also discloses the use of adhesive strips on the opposite sides of permeable membranes used for building construction.

It is well known in the art to use integral adhesive strips applied to the sheet material for fastening overlaying strips together. Such application is disclosed by U.S. Pat. No. 8,387,336 issued Mar. 5, 2013, U.S. Patent Application Publication Number 20060096218 published May 11, 2006 and U.S. Patent Application Publication Number 20040180195 published Sep. 16, 2004. Other such uses of integral adhesive tape which have been commercially sold are TYVEK® SUPRO PLUS and DELTA®-FASSADE S PLUS by E. I. du Pont de Nemours and Company and Cosella-Dorken Products, Inc., respectively.

U.S. Pat. No. 6,804,922 issued Oct. 19, 2004 is directed to a weather barrier for use in building. It is a composite building material comprising an integral unitary member including a polymeric weather barrier, a drainage mat formed of an open, three dimensional matrix of plastic filaments formed in an overlapping irregular looped and intermingled fashion and a securement means for attaching the drainage mat to the weather barrier.

U.S. Pat. No. 6,594,965 issued Jul. 22, 2003 is directed toward an inner sheeting material with a corrugated mat of randomly convoluted polymeric filaments having undulating faces and U.S. Pat. No. 6,131,353 issued Oct. 17, 2000 discloses a weather barrier having (i) a plurality of spaced adhesive spots and (ii) a plurality of substantially parallel adhesive strips for attaching a three-dimensional matrix of overlapping loop mesh of a polyamide resin such as Nylon.

U.S. Pat. No. 5,960,595 issued Oct. 5, 1999 shows a building member having a polymeric weather barrier and a mat of an open, three dimensional matrix of plastic filaments of polyester and nylon in overlapping and randomly convoluted and intermingled fashion that are heat bonded and an adhesive securement means.

U.S. Pat. No. 5,099,627 issued Mar. 31, 1992 is directed to an openwork member constructed of a matting of individual randomly convoluted filaments made of a plastic polymeric material (such as Nylon) having a smooth side which is positioned over a roofing felt and secured to a deck member by staples through the felt.

It is further disclosed in the previous noted reference that the mat is sufficiently resistant to compression so that the installer can easily feel when the shingle is pressed firmly against the mat, and drive the nail until the nail head is against the shingle, leaving the cap raised about ⅝ inch above the underlying roof shingles.

In another U.S. Pat. No. 5,425,672 issued Jun. 20, 1995, the mat material (Nylon or polyester) is provided with two lateral edge bands on each side of the roll of matting of adhesive coating to adhere or secure the matting to the roof shingles or any other planar surface.

European Patent Number 0874099 published Oct. 28, 1998 is directed to a diffusion sheet in the form of a biased undersheet for roofs. The sheet is a diffusion film layer with a web of poly directional filaments forming a loop-like inter-twined sub area seated in a foil sheet. A metal sheet or covering is shown mounted to the web. It is noted that possible applications of the product can be used with a vapor-permeable membrane such as TYVEK®.

U.S. Pat. No. 4,252,590 issued Feb. 24, 1981 is directed toward the process of making a mat of melt-spun synthetic polymer filaments laid in overlapping rows of looped and intermingled filaments to form a peak and valley three-dimensional structure underlaying on the longitudinal and transverse directions of the matting, the individual filaments being self-bonded at random points of intersection to provide transverse strength. This structure consists of open random filaments which are fused at random points of intersection.

U.S. Pat. No. 4,098,044 issued Jul. 4, 1978 discloses a sheathing board formed with longitudinal grooves to facilitate the "passage of air." It further notes that the sheathing allows free movement of air in the wall interior to relieve moisture accumulation. As indicated by the arrows, air travels through moisture-permeable insulation, and upwardly into a series of vertical upper grooves.

SUMMARY OF THE INVENTION

The present invention is directed to a building enclosure component in the nature of vapor permeable water resistive barrier/air barrier membrane manufactured from a vapor permeable spunbonded polypropylene fabric with tip to a 6 inch integrated tape or tapes positioned down from the horizontal joint on the front face of the spunbonded polypropylene fabric and a 1½ inch to 3 inch integrated tape secured adjacent the horizontal joint on the rear backing face of the membrane. Alternatively, a larger 6 inch integrated tape can be secured adjacent the horizontal joint on the rear backing face of the membrane.

A drainage matrix is attached to the membrane beneath the 3 inch to 6 inch integrated tape and extends over the membrane to the other end of the membrane creates a drainage cavity for wall cladding systems such as wood siding, metal siding, masonry veneers, stucco, mechanically attached EIFS and veneer stone facades.

It is an object of the invention to provide a building membrane having excellent liquid water holdout while preventing air leakage and allowing the structure to breathe or dry-out as necessary, to meet the conditions of seasonal changes for each climate zone.

It is also an object of the present invention to provide a rain screen matrix integral on the membrane so that everything can be installed in one step.

It is another object of the invention to provide that the drainage matrix maintains an unimpeded vertical drainage plane behind the cladding.

It is a further object of the invention for the incorporation of the integrated tape at the horizontal seams to increase ease of installation, eliminate tape failure, reverse laps and additional associated costs.

The invention will be better understood and objects other than those set forth above will become apparent when consideration is given to the following detailed description thereof. Such description makes reference to the annexed drawings herein.

DETAILED DESCRIPTION OF THE INVENTION

The preferred embodiment and best mode of the invention are shown in FIGS. 1-9. While the invention is described herein with regard to certain preferred embodiments, it is not intended that the present invention be so limited. On the contrary, it is intended to cover all alternatives, modifications, and equivalent arrangements as may be included within the spirit and scope of the invention as defined by the appended claims.

Figure 2:
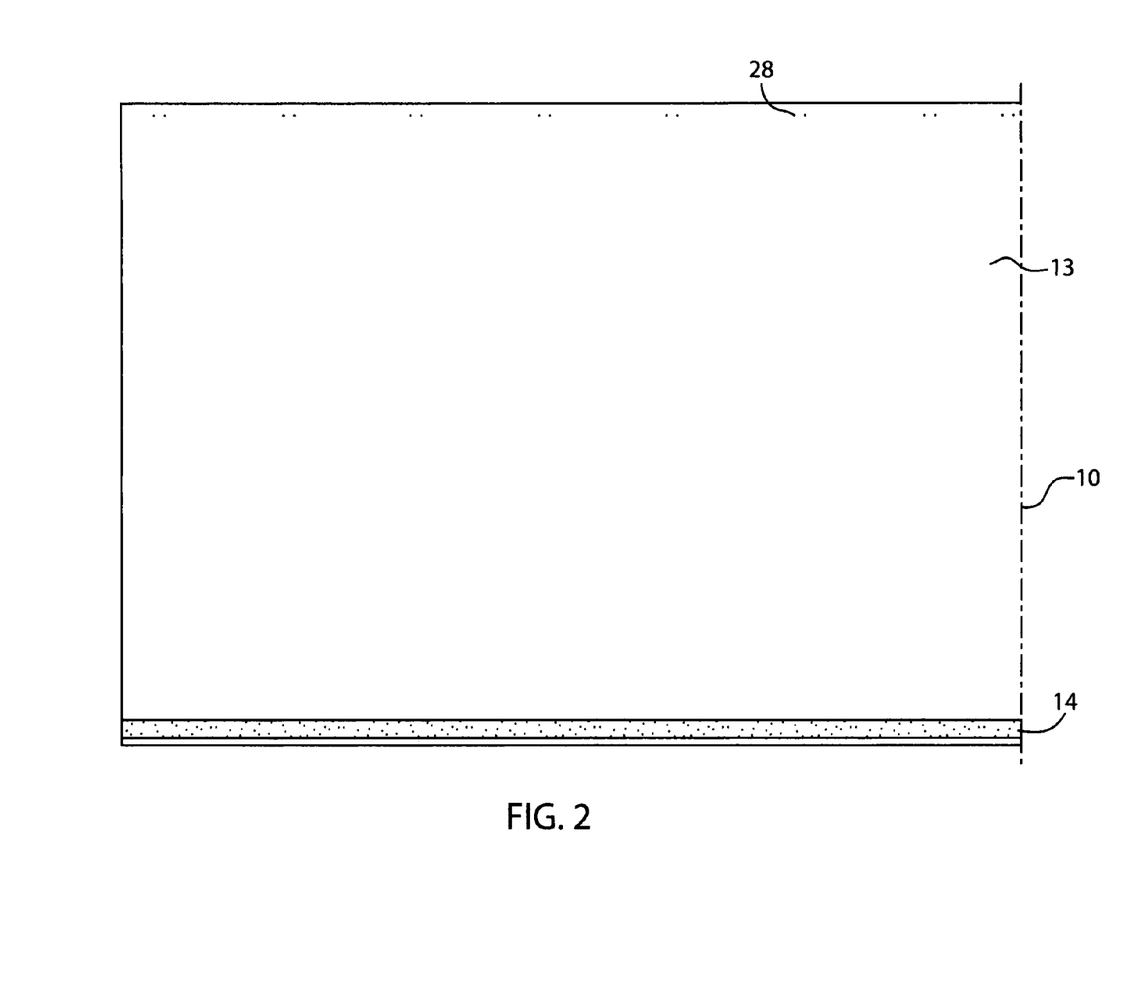
FIG. 2 is a bottom plan view of the opposite side of the building membrane shown in FIG. 1.
Figures 3, 4, 5:
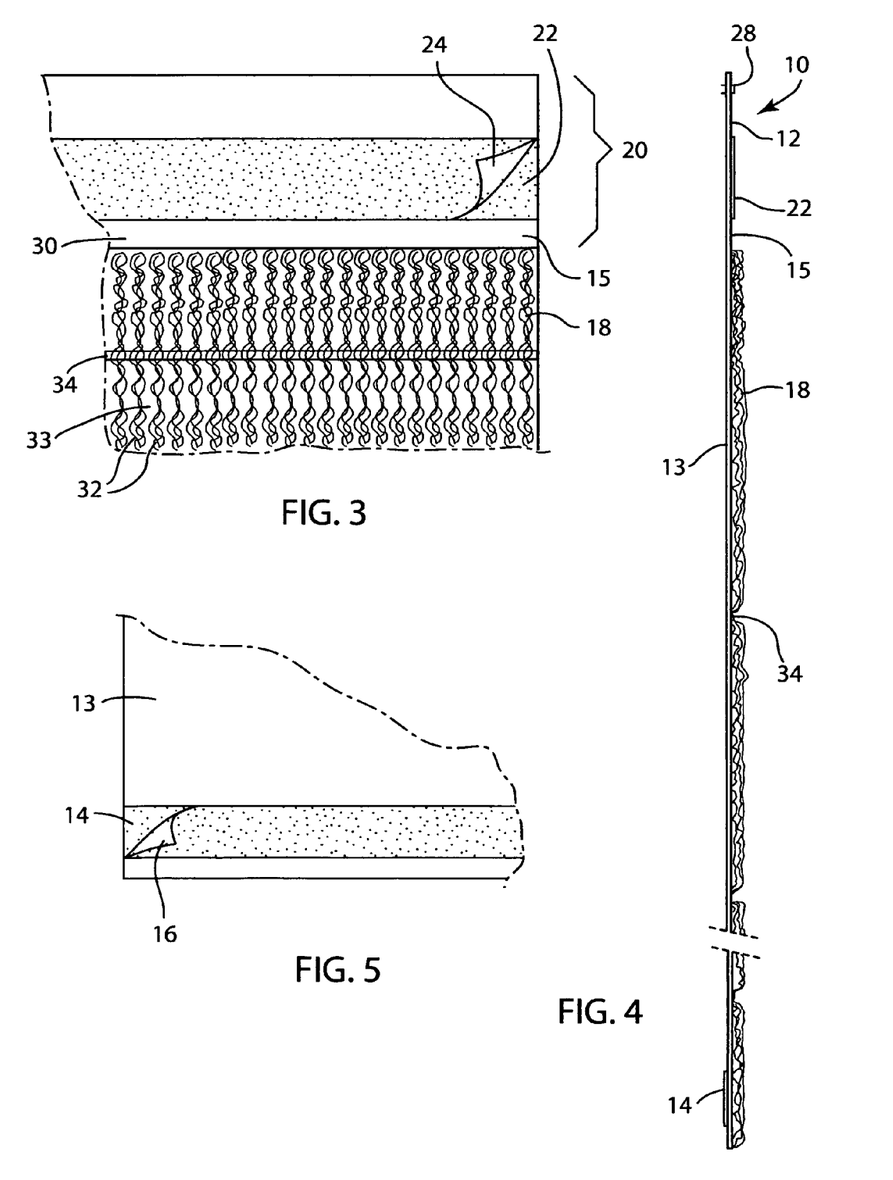
FIG. 3 is an enlarged sectional top plan view of a portion of the building membrane of shown in FIG. 1.
FIG. 4 is a side elevational view of the building membrane of FIG. 1 when same is fastened to a structure.
FIG. 5 is an enlarged sectional bottom plan view of the rear surface of the building membrane shown in FIG. 2 showing the release liner partially removed.
Figure 6:
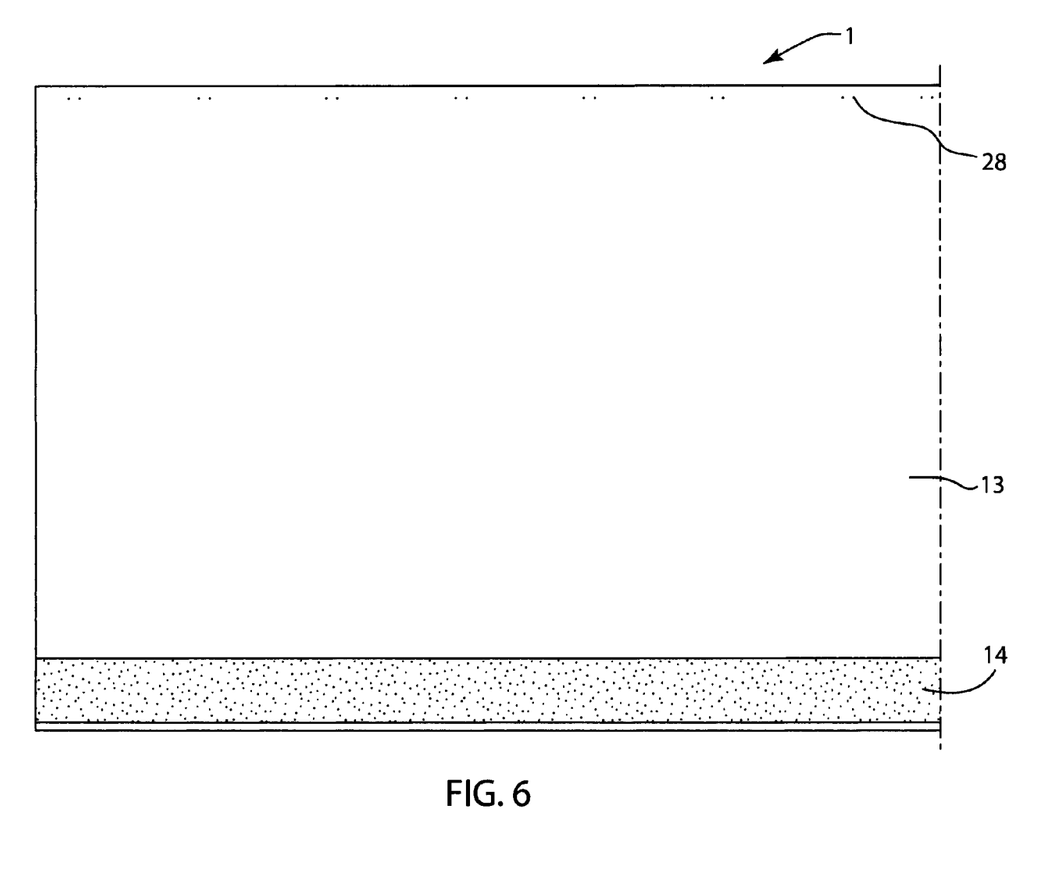
FIG. 6 is a bottom plan view of the building membrane shown in FIG. 2 with a wider rear adhesive strip.

The vapor permeable membrane of the invention is a flexible sheet normally supplied in roll form for application to the outside of a building. Referring now to the drawings and the illustrative embodiments depicted therein, the building membrane 10 is constructed of a vapor permeable spunbonded polypropylene fabric 12 with a polypropylene back surface 13. The backing 13 as shown in FIG. 2 and FIG. 6 has a 1½ inch to 8 inch, preferably 2 inch integrated permeable adhesive strip or strips 14 with a release cover liner 16 placed on the back surface of the membrane 10 so that when the membrane sheet 10 is mounted on the building structure it is located adjacent the bottom horizontal edge of the membrane. As shown in FIG. 6, a wider tape can be used ranging from about 6 inches to about 8 inches, preferably about 6 inches. Random polypropylene fibers form a drainage matrix 18 which is heat bonded to the front surface 15 of the membrane to the spunbonded polypropylene fabric 12. The drainage matrix 18 covers the front surface 15 of the membrane with the exception of a 6 inch to 8 inch area 20 of the membrane base material which extends from the top horizontal edge 17 of the membrane downward to the upper edge of the matrix. As shown in FIG. 3, the upper top area 20 of base material has a 3 inch to 3½ inch, preferably 3¼ inch permeable adhesive strip 22 across the top area 20 with a release cover liner 24. An upper 2¼ inch to 2½ inch area 26 comprising the membrane fabric extends from the upper edge of the adhesive strip 22 to the edge 17 of the base material to receive staples or fasteners 28 for fastening the same to a building. A ½ inch to 1 inch strip 30 of base material separates the top adhesive strip 22 from the top of the drainage matrix 18. It should be noted that the top area 20 can have a plurality of adhesive strips or a unitary adhesive strip which cover the area 20 of the base material.

Figure 1:
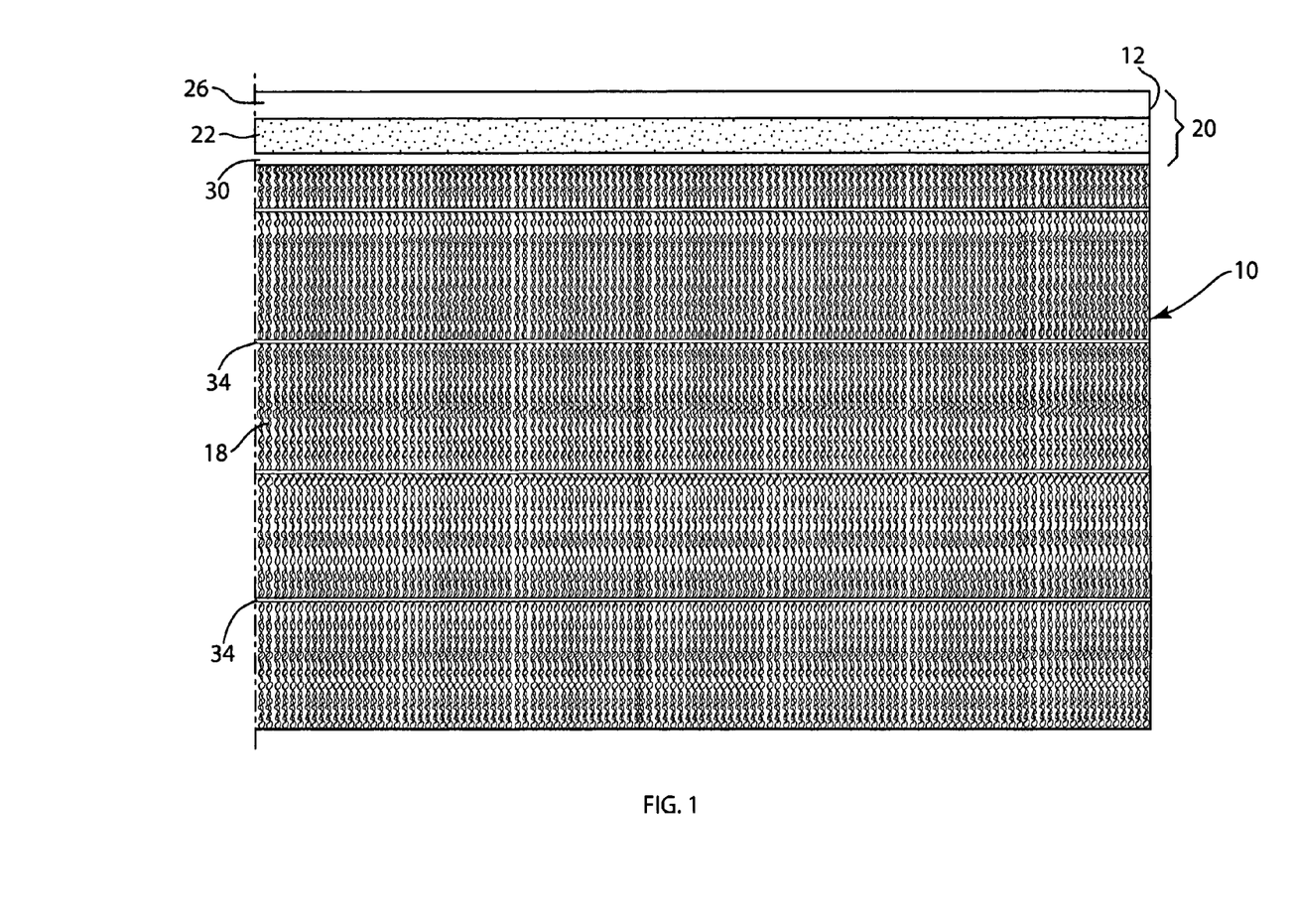
FIG. 1 is a top plan view of the building membrane in accordance with the present invention.
Figure 7:
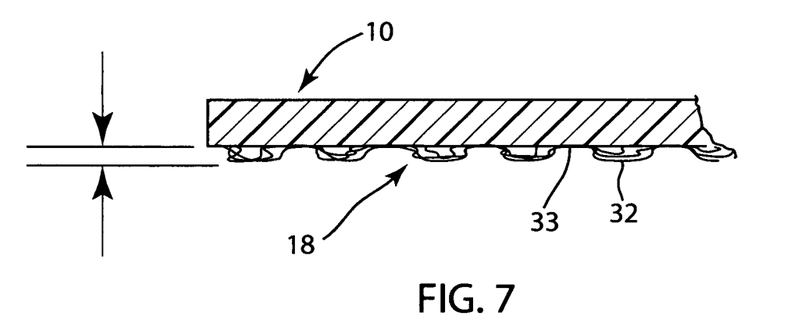
FIG. 7 is an enlarged cross sectional view of a 3 mm drain matrix shown in FIGS. 1 and 3.
Figure 8:
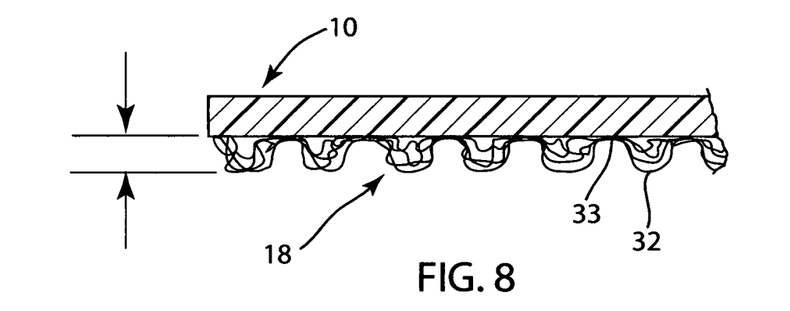
FIG. 8 is an enlarged cross sectional view of a 7 mm drain matrix embodiment.
Figure 9:
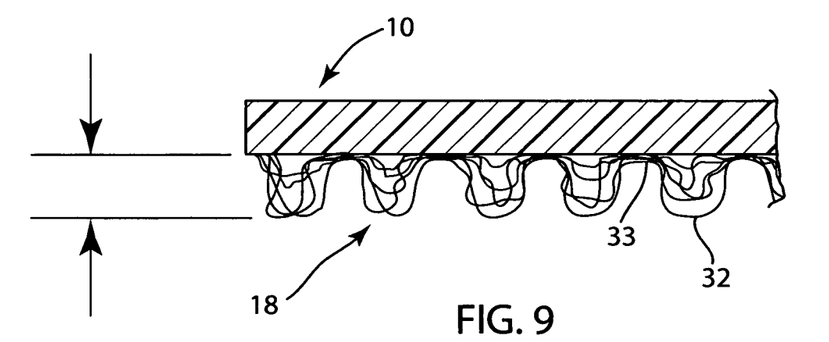
FIG. 9 is an enlarged cross sectional view of a 11 mm drain matrix embodiment.

The drainage matrix 18 is available in 3 row heights, 3 mm, 7 mm and 11 mm of nominal dimension plus or minus 1 mm as shown in FIGS. 7-9 with widths ranging from ½ inch to 1 inch. The matrix 18 is spot heat bonded across the membrane width. The membrane 10 is approximately 59 inches in width and 37.5 feet in length. The drainage matrix 18 is formed with a series of drainage rows 32 of polypropylene, nylon or CLP plastic threads with each row being spaced apart by a channel 33 and running vertical to the top area 20 and bottom surface edge of membrane 10. The vertical raised thread rows 32 on the matrix are separated by spaced channels 33. The drainage rows run from about 16 to about 25 rows per linear foot, which variance is caused by the differences in matrix row height. The drainage matrix rows 32 are separated at 1 foot intervals by spaces to provide for a plurality of ¾ inch expansion joints 34 on the drainage matrix. The expansion joints 34 run parallel to the top and bottom edges of the membrane 10 and are positioned perpendicular to the linear orientation of the drainage rows 32 as shown in FIGS. 1 and 3 with the base of the expansion joint being about the same height as the base of the channels 33 between rows. The drainable matrix 18 is spot heat welded to the spunbonded base material 12 so that a unitary sheet material is formed.

The present integrated rain screen vapor permeable water resistive air barrier sheet membrane with integrated tape can remain exposed to the elements for up to 180 DAYS prior to installation of cladding system. The rain screen cavity created by the integrated matrix, greatly increases the drying capacity of the building envelope and the inventive material protects against water intrusion and is vapor permeable, allowing the building materials that may have become wet during the construction phase to dry out, reducing the risk of wood rot, deterioration or corrosion. The air barrier function of the system increases the energy efficiency of the building envelope, as well as prolonging the life of the structure by reducing air borne moisture loading.

The vapor-permeable membrane may be a spunbonded polypropylene sheet material, for example, such as WallShield® and WrapShield™ brand weatherizing membranes, available from VaproShield, LLC, of Gig Harbor, Wash. As noted above, the membrane is substantially impervious to liquids such as water, but is permeable to gases such as water vapor. The integral adhesive can be standard adhesive or a vapor permeable adhesive for the bottom interior adhesive strip or the top front adhesive strip.

The present inventive membrane 10 with integrated tape is mechanically fastened to the building. Stainless steel staples may be used just above the horizontal tape line of adhesive tape 28 as temporary fasteners during installation. It is recommended that the installer does not staple excessively in the field and should not place staples in the integrated tape overlap area, prior to removal of the tape release papers and sealing of the horizontal integrated tape seam. Staples should be placed in the overlap area only after the integrated tape release or cover had been removed and the joint is sealed. At the vertical seam location of the sheets, 11¾ inch wide VaproFlashing SA is applied vertically and directly on the substrate at the vertical seam location. Dow Corning® 758 adhesive sealant is applied to VaproFlashing SA, directly behind vertical seam, and hand smoothed to activate sealant. The horizontal seams are joined by pulling and removing release papers simultaneously (from the upper and lower courses of membrane). Hand pressure is then applied to engage horizontal tape joint.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

What is claimed is:

1. A building wrap membrane comprising a flexible sheet of spun bonded vapor permeable polypropylene base sheet member with integral adhesive attachment means positioned on a front and back surface of said base sheet member, said adhesive attachment means comprising at least one pressure sensitive adhesive strip with a release cover mounted to said front and back surface of said base sheet member, a drainage matrix secured by heat bonding to said front surface of said base sheet member, said drainage matrix being constructed of individual thermoplastic threads randomly laid down and secured together by heat bonding; said thermoplastic threads being formed into parallel spaced rows forming channels between each spaced row with a plurality of expansion joints intersecting said spaced rows, said drainage matrix secured to said base sheet member leaving an uncovered area at a top of said base sheet member, an adhesive pressure sensitive attachment strip is secured to said uncovered area and extends horizontally along said uncovered sheet member area, said drainage matrix extending from said uncovered area over a surface of said base sheet member substantially covering the rest of said base sheet member.

2. A building wrap membrane of claim 1, wherein said drainage matrix rows are composed of nylon threads.

3. A building wrap membrane of claim 1, wherein said drainage matrix rows are composed of polypropylene threads.

4. A building wrap membrane of claim 1, wherein said adhesive attachment means positioned on the back of said base sheet member is at least one strip of vapor permeable pressure sensitive adhesive ranging from about 1½ inches to about 6 inches in width with a release cover.

5. A building wrap membrane of claim 4, wherein said adhesive strip with a release cover is about 6 inches in width.

6. A building wrap membrane of claim 1, wherein said adhesive attachment means positioned on a front of said base sheet member is at least one strip of vapor permeable pressure sensitive adhesive with a release cover, said at least one strip of pressure sensitive adhesive being positioned above said drainage matrix parallel to an outer edge of said drainage matrix.

7. A building wrap membrane of claim 1, wherein each said expansion joint ranges from ½ inch to 1 inch in width.

8. A building wrap membrane of claim 1, wherein each thread row has a height of about 3 mm nominal plus or minus 1 mm in height.

9. A building wrap membrane of claim 1, wherein each thread row has a height of about 7 mm nominal plus or minus 1 mm in height.

10. A building wrap membrane of claim 1, wherein each thread row height is about 11 mm nominal plus or minus 1 mm in height.

11. A water vapor permeable air and moisture barrier rain drainage sheet member that can be mounted to a building wall structure to form a building envelope comprising a spun bonded polypropylene sheet member with integral adhesive attachment means mounted on a front and back surface of said sheet member, said adhesive attachment means having a pressure sensitive adhesive with a removable cover liner, a drainage matrix secured to said sheet member on said front surface of said sheet member below said front surface adhesive attachment means by spot welding said drainage matrix to said sheet member, said drainage matrix being comprised of individual thermoplastic threads randomly laid down and secured together by heat bonding; said thermoplastic threads being formed into spaced rows ranging from about ½ inch to about 1 inch in width with a substantially uniform height and a uniform channel, a plurality of linear expansion joints ranging from about ½ inch to about 1 inch in width intersect said spaced rows and are positioned perpendicular to said spaced rows, said drainage matrix secured to a surface of said sheet member leaving a space from an upper end of said drainage matrix to an upper edge of said sheet member ranging from about 6 inches to about 9 inches in width.

12. A building wrap membrane of claim 11, wherein each row has a height about 3 mm nominal plus or minus 1 mm in height.

13. A building wrap membrane of claim 11, wherein each row has a height about 7 mm nominal plus or minus 1 mm in height.

14. A building wrap membrane of claim 11, wherein each row has a height of about 11 mm nominal plus or minus 1 mm in height.

15. A building wrap membrane of claim 11 wherein said adhesive tape applied to the front surface of said sheet member ranges from about 2½ inches to about 4½ inches in width.

16. A building wrap membrane of claim 11 wherein said adhesive tape applied to the rear surface of said sheet member ranges from about 1½ inches to about 6 inches in width.

17. A water vapor permeable air and moisture barrier rain drainage sheet configured in sheet form that can be applied to a building wall structure comprising a sheet of spun bonded polypropylene sheet member with integral adhesive attachment means formed on opposite surfaces of said sheet member, said adhesive attachment means comprising a plurality of permeable pressure sensitive adhesive strips with a respective release cover, at least one of said permeable pressure sensitive adhesive strips being positioned on, a top portion of a front surface of said sheet member about 2 inches from a top edge of said sheet member and at least one pressure sensitive adhesive strip positioned on a bottom portion of a rear surface of said sheet member adjacent a bottom edge of said sheet member, a drainage matrix secured to said sheet member on the front surface of said sheet member below said front sheet permeable pressure sensitive adhesive strip, said drainage matrix being comprised of individual thermoplastic threads randomly laid down to form a fibrous mat and secured together by heat bonding; said drainage matrix being secured to one surface of said sheet member by spot welding, said matrix thermoplastic threads being formed into a plurality of spaced parallel rows ranging from about ½ inch to about 1 inch in width and forming a channel with a base there between, a plurality of expansion joints are formed across said thread formed spaced parallel rows and positioned perpendicular thereto said expansion joints being substantially level to said base of each channel formed by said spaced parallel rows, said drainage matrix being secured to a surface on one side of said sheet member leaving a space from an upper edge of said drainage matrix to an upper edge of said sheet member ranging from about 6 inches to about 9 inches.

\* \* \* \* \*